3,758,370
METHOD FOR MANUFACTURING A MULTI-PLY BOARD OF THERMOPLASTIC MATERIAL AND PRODUCT RESULTING THEREFROM

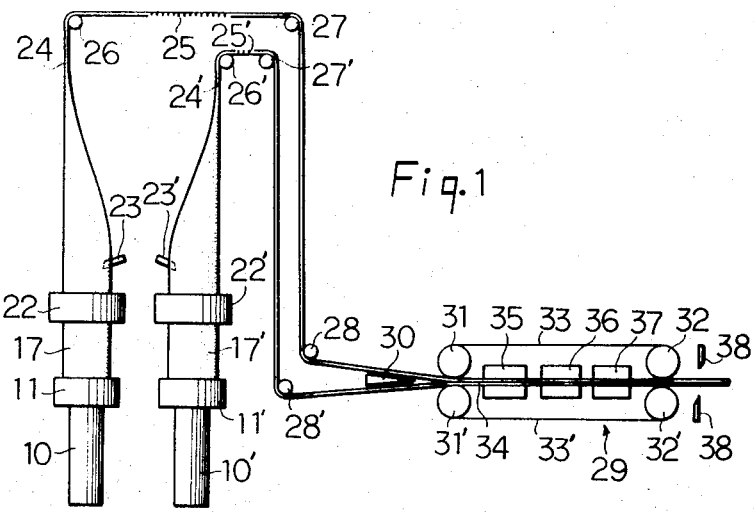
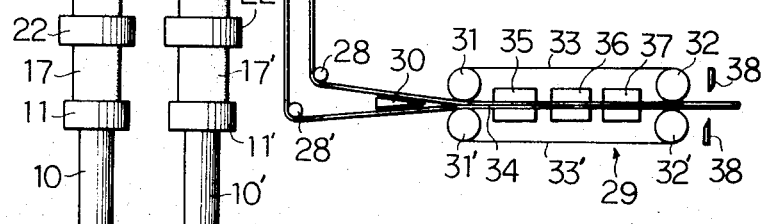
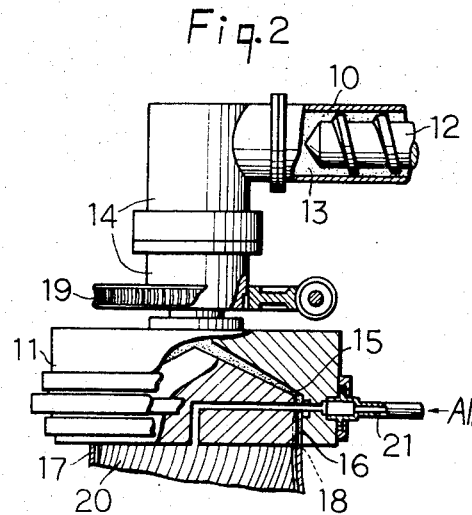
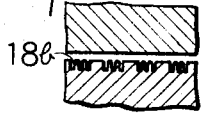
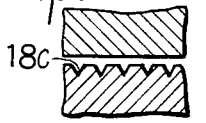

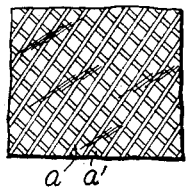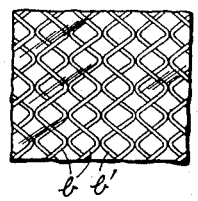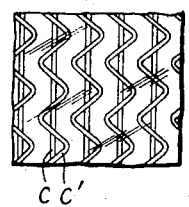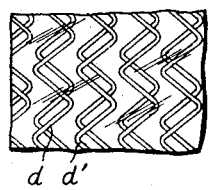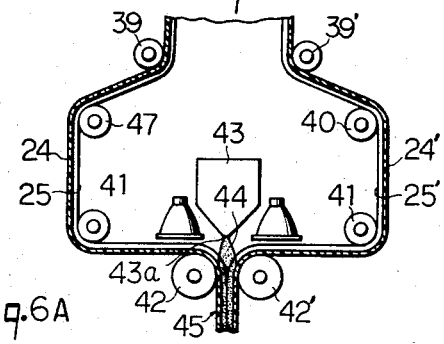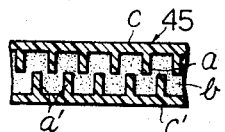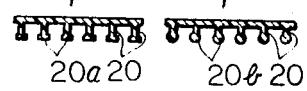

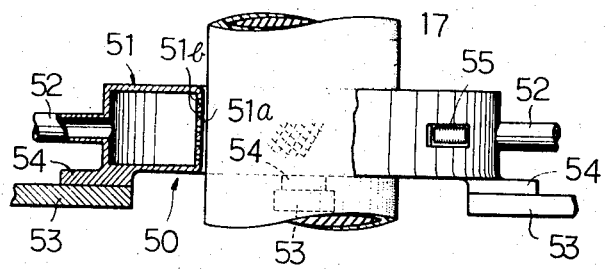
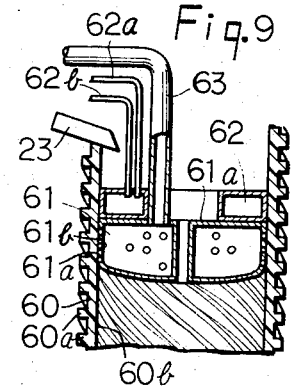
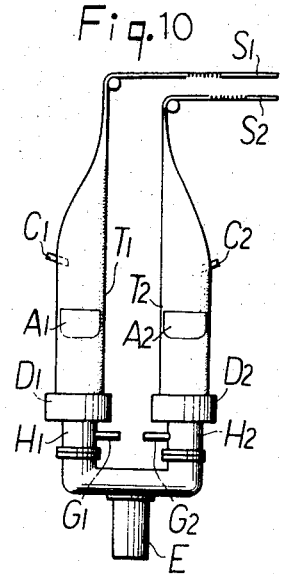
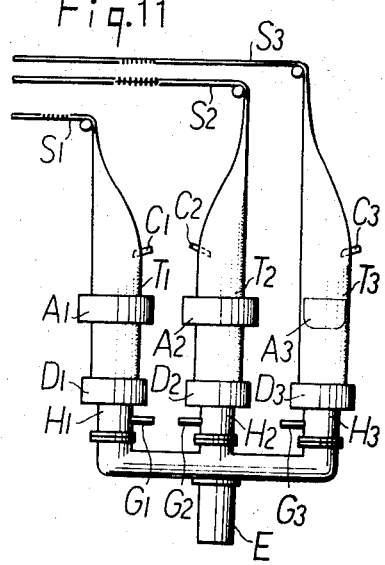

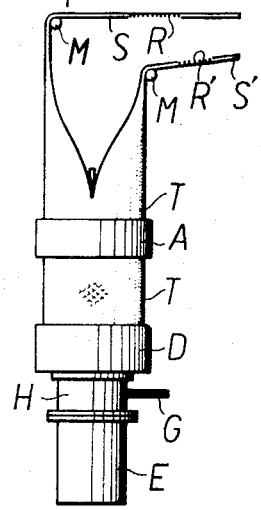
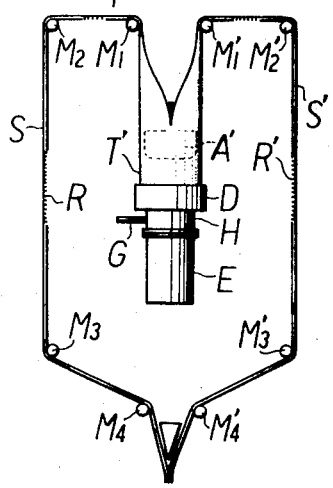
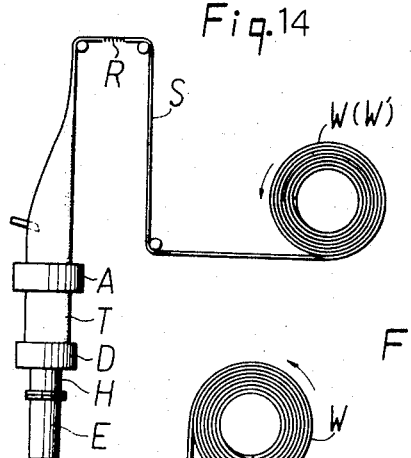
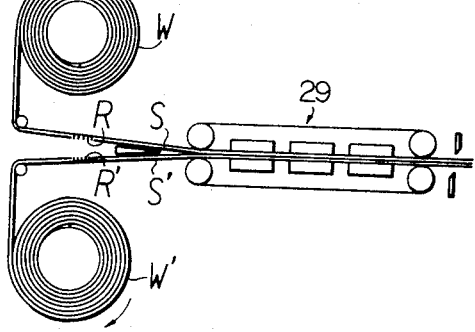

Masao Sakurai, Yokohama, Kikuo Muto, Kawasaki, and Noritsugu Sugimoto, Sagamihara, Japan, assignors to Gunze Kobunshi Kogyo Kabushiki Kaisha, Kanagawa, Japan
Filed May 7, 1971, Ser. No. 141,193
Claims priority, application Japan, May 8, 1970, 45/38,900; Sept. 11, 1970, 45/79,333; Nov. 26, 1970, 45/103,635; Feb. 2, 1971, 46/3,605; Feb. 12, 1971, 46/5,564; Feb. 15, 1971, 46/6,365
Int. Cl. B32b 5/18
U.S. Cl. 161—69                 10 Claims

ABSTRACT OF THE DISCLOSURE

A multi-ply thermoplastic board is manufactured by steps comprising producing two flat strips of a thermoplastic material, each of said strips having on at least one side thereof a ribbed surface which is formed with a plurality of spaced ribs, the ribs on one strip being angularly deviating from the ribs on another strip, extruding a tubing of said thermoplastic materials, forming on at least one side thereof a ribbed peripheral surface with a plurality of spaced parallel ribs extending substantially in parallel to an axis of said tube, drawing the strips with the ribbed surface thereof facing each other, heating tops of said ribs to the fused condition, and combining the strips together through fusion of the facing top of the ribs.

---

This invention generally relates to improvements in the manufacture of a multi-ply board of thermoplastic material, mainly for use in the industrial packaging of various articles during transit. The improvements are specifically directed to increasing the mechanical strength of the thermoplastic board in substantially every direction.

A variety of multi-ply boards of thermoplastic material are used for packaging purposes. Representative of such known multi-ply boards is the corrugated plastic board which is made up of a pair of outer layers and a single corrugated layer which is sandwiched by the outer layers and adhered thereto through tops of the corrugations. The corrugated plastic board having such structural elements is suited for the production on a large commercial basis and, as such, has been commonly accepted in the production industry. In spite of the adaptability to the commercial production, the corrugated plastic board is not fully accepted for the packaging of especially heavy articles because of the insufficient mechanical resistance to a bending stress exerted to the board in directions perpendicular to the corrugations. A problem is left even in the production industry of the corrugated plastic board on account of the costly production equipment which is complicated in construction and operation.

It is, therefore, an important object of this invention to provide an improved multi-ply thermoplastic board which has a satisfactory mechanical resistance to a bending stress exerted to the board in practically any direction.

In a method which is adapted to achieve these objects of this invention, at least two substantially flat strips of a thermoplastic material is produced. Each of the strips thus produced has on at least one side thereof a ribbed surface which is formed with a plurality of spaced ribs. The ribs on one strip are to be patterned as to angularly deviate from the strip on another strip. The strips are then drawn with the ribbed surfaces facing each other and are caused to have the tops of the ribs heated to a fused condition. The strips are combined together through fusion of the tops of the facing ribs to each other thereby to form an integral multi-ply thermoplastic material. The strips having the ribbed surfaces are produced from one or more tubings. The tubing is extruded from an extrusion die having an annular slot which is defined by at least one serrated peripheral wall so that the extruded tubing has on at least one side a ribbed surface which is formed with a plurality of spaced ribs extending in a direction substantially parallel to the axis of the tubing. The tubing is then drawn and cut in the longitudinal direction for being spread out into a substantially flat strip. The strips may be combined together substantially concurrently as they are produced in a single line or may be temporarily stored and afterwards combined together thus in two lines. Where the strips are combined in a single line, the extrusion dies may be connected either to respective extruder machine which are separate from each other or to a common extruder machine by which the individual extrusion dies are supplied with the thermoplastic material in a fused or plastic condition. Two substantially identical strips may be produced from a single tubing. In this instance, the tubing extruded from an extrusion die is longitudinally into two halves and are thereafter spread out into substantially flat strips which have a ribbed surface on at least either side. Where, moreover, the multi-ply board is produced in two lines, the produced strips may be temporarily stored in a suitable manner in a primary line and may be combined together into the final product in a secondary line. For this purpose, the strips produced may be wound on reels in the primary line and unwound from the reel in the secondary line.

During formation of the tubings, at least one of the tubings may be twisted about an axis of the twisted tubing so that the ribs which extend thereon in parallel to the axis of the tubing are caused to angularly deviate from such axis. In this instance, the tubing may be twisted either for full rotation or for oscillation through a limited angle. Where the tubing is rotated for full rotation about its axis, then the resultant strip will have ribs extending linearly thereon. Where, on the other hand, the tubing is twisted alternately in clockwise and counter clockwise directions through a limited angle, then the ribs formed on the resultant strip will be so patterned as to meander along the longitudinal direction of the strip.

If desired, an intermediate layer may be interposed between the strips forming the multi-ply board. Such intermediate layer will serve to securely hold the ribs on the inner sides of the strips so that the mechanical strength of the final product is increased. The intermediate layer may be formed by a thermoplastic material which may preferably be of the foaming type.

The multi-ply thermoplastic board produced in accordance with this invention includes at least two inner layers each made up of a set of spaced ribs and a pair of outer layers which are integral on their inner surfaces with the ribs of the inner layers. The two sets of ribs forming the two inner layers are patterned to cross each other so as to provide a sufficient mechanical resistance to bending stresses exerted to the multi-ply board in practically any direction. The number of the inner layers made up of the spaced ribs may be selected at will depending upon the desired mechanical strength of the resultant multi-ply thermoplastic board. If desired, an intermediate layer of foaming plastic material may be interposed in between the outer layers thereby to add to the mechanical resistance of the inner layers. The material which is applicable for the formation of the multi-ply board according to this invention may be any of the known thermoplastic materials such as for example high-density polyethylene, polypropylene, polystyrene, hard or semi-hard polyvinyl chloride or copolymer or polymethyl methacrylate or acrylnitril butadiene styrene terpolymer or nylon of two or more of these.

The multi-ply thermoplastic board having the above-mentioned construction and features is produced with use of a modified extrusion die. The extrusion die is combined with a usual extruder machine which is adapted to extrude a continuous tubing of thermoplastic material in a fused condition. The extrusion die has an annular slot through which the tubing is extruded. The annular slot is defined by opposed inner and outer peripheral walls forming part of the die and a plurality of spaced linear serrations are formed on at least either of the inner and outer peripheral walls. The serrations extend in a direction substantially parallel to the axis of the tubing to be extruded so that a plurality of spaced parallel ribs are formed on at least either of the peripheral surfaces of the tubing. In this instance, the die may be held stationary so that the parallel ribs extend unidirectionally in parallel to the axis of the tubing. Or otherwise, the die may be turned for full rotation in a fixed direction or reciprocally in opposite directions through a limited angle, for causing the tubing to be twisted continuously or through a limited angle. If the die is fully rotated continuously, the ribs formed on the tubing will be caused to slant with respect to the direction parallel to the axis, of the extruder tubing and, if the die is turned in the alternately clockwise and counter clockwise directions through a limited angle, then the ribs will be caused to curve or meander. The tubing is then cut in a lengthwise direction and opened into a substantially flat strip having formed on at least either side thereof a pattern of the ribs which extend unidirectionally or are curved or meandering. At least two of the strips thus produced are combined together in such a manner that the ribbed surfaces are fused with each other through the fusion of the tops of the ribs. If, now, two strips resulting from two extruded tubings are combined with each other, the resultant multi-ply board will have two integral layers each made up of a set of spaced ribs and a pair of outer layers which are internally integral with the layers of the ribs. If desired in this instance, a third strip of a thermoplastic material in a fused condition may be inserted between the two ribbed surfaces of the strips whereby the ribs are securely gripped by an additional layer. The thermoplastic material to be used for this purpose may preferably be of the foaming type.

The pattern of the spaced ribs may be varied in numerous manners. If the extrusion die is turned at the higher speed, then the tubing is twisted at the greater angle so that the resultant pattern of the ribs becomes denser, adding to the mechanical strength of the final product. For this purpose, it is preferable that the twisting angle of the extruded tubing be regulated in relation to the turning speed of the extrusion die and to the rate of extrusion of the tubing. Such regulation of the twisting angle may be carried out either mechanically or pneumatically applying an opposing effort to the twisting motion of the tubing which is being fed from the extrusion die.

The flat strip resulting from the extruded tubing is usually in a set or cured condition and it is, therefore, important when combining two or more strips together to have the strips internally heated so as to enable the ribbed surfaces of the strips to resume the initial fused condition.

The tubing may be cut and spread out into either a single flat strip or a pair of identical flat strips. Where two flat strips are to be produced from a single tubing, it is important that the tubing having a relatively great diameter be extruded by the use of a relatively large-sized extrusion die.

Various other objects, features and advantages of this invention will be apparent to those skilled in the art from the following description taken in conjunction with the accompanying drawings in which:

FIG. 1 is a schematic view showing a preferred production arrangement which is adapted to produce a multi-ply thermoplastic tubing according to this invention;

FIG. 2 is a partial cut-away view showing, on an enlarged scale, a preferred example of an extrusion die used in the arrangement shown in FIG. 1;

FIG. 3 is a view showing examples of the section of an annular slot formed in the extrusion die of FIG. 2;

FIG. 4 is a view showing examples of the pattern of ribbed layers of the multi-ply thermoplastic board produced in accordance with this invention;

FIG. 5 is a side elevational view partially showing a modified form of a production arrangement adapted to produce a modified form of multi-ply thermoplastic board;

FIG. 6 is a view showing examples of the section of the multi-ply thermoplastic board produced through use of the arrangement shown in FIG. 5;

FIG. 7 is a view showing further examples of the section of the annular slot formed in the extrusion die of FIG. 2, these examples being specifically suited for the production of the multi-ply thermoplastic board of the configurations shown in FIG. 11;

FIG. 8 is a partially cut-away view of a device which is adapted to regulate an angle at which the extruded tubing is twisted;

FIG. 9 is a sectional view showing a modification of the device of FIG. 8, which may be used in one preferred method according to this invention;

FIGS. 10 and 11 are schematic views showing modified forms of the production arrangement in which a plurality of extrusion dies are connected to a common extruder machine;

FIGS. 12 and 13 are also schematic views showing still further modified forms of the production arrangement in which two strips are produced from a single tubing extruded from a single extrusion die; and FIGS. 14 and 15 are also schematic views showing a further modified form of the production arrangement in which the multi-ply board according to this invention is produced in two separate lines.

Reference is now made to FIG. 1 which shows a first form of the arrangement which is adapted to produce a multi-ply thermoplastic board from two tubings which are extruded from two independent extrusion dies. Reference numerals 10 and 10' generally designate a pair of extruder machines which are respectively provided with substantially identical extrusion dies 11 and 11'.

A preferred example of the construction of each of these extrusion dies 11 and 11' is illustrated in FIG. 2. Referring to FIG. 2, the extruder machine 10, which per se is well known in the art, is shown to comprise an extruder screw 12 through which a thermoplastic material 13 in a fused condition is supplied to the extrusion die 11 through an extrusion cross-head 14. The extrusion die 11 has formed therein a conical passage 15 which leads to an annular slot 16 whereby the fused thermoplastic material is extruded continuously to form a tubing 17 in a fused or plastic condition. The annular slot 16 is defined by inner and outer concentrical peripheral walls (not numbered) forming part of the die structure and a plurality of spaced linear serrations are formed on either of the inner and outer peripheral walls. Such serrations are herein shown as formed on the inner peripheral wall of the annular slot and are designated by reference numeral 18. The serrations 18 are spaced from each other either equidistantly or unequidistantly and extend substantially in parallel to an axis of the tubing 17 extruded through the annular slot 16. The serrations 18 may be configured in various manners, examples being illustrated in FIG. 3. The example A shows serrations 18a which have generally rectangular sections which are spaced apart at a constant distance while, in the example B, a certain number of rectangular serrations 18b are grouped. The serrations 18c of the example C have uniform trapezoidal sections while the serrations 18d of the example D have trapezoidal sections which are directed alternately in opposite directions so as to form alternately upright and inverted V-shaped grooves between the serrations.

Referring again to FIG. 2, the extrusion die 11 is arranged to be either held stationary relative to the extruder machine 10 or turned for full rotation about its axis or recipocally through a limited angle whereby the tubing 17 extruded from the extrusion die 11 is twisted accordingly. For such full or limited rotation of the extrusion die 11, driving means is provided which may include a combination rack and worm gear arrangement 19 which is shown to be mounted on the cross-head 14.

Where the extrusion die 11 is held stationary as customary in the conventional plastic extrusion techniques, a plurality of spaced linear ribs will be formed on the extruded tubing 17, extending substantially in parallel to the axis of the tubing. Where the extrusion die 11 is fully rotated while the tubing 17 is being extruded therefrom, a plurality of spaced ribs slanting with respect to the axis of the extruded tubing will be formed on the tubing as the tubing is fully twisted about its axis. If, furthermore, the extrusion die 11 is turned alternately clockwise and counter clockwise through a limited angle, then the tubing 17 is twisted oscillatorily in opposite directions so that a plurality of spaced, meandering or generally zigzagging ribs will be formed on the tubing. The extrusion die 11 of FIG. 2 is exemplified as being fully rotated about its axis so as to form a number of spaced ribs 20 slanting with respect to the axis of the tubing 17.

Turning back to FIG. 1, the extrusion dies 11' and 11 are thus adapted to produce tubings 17 and 17' each having a ribbed inner surface. In order that the mechanical strength of the final product be increased, it is advantageous to regulate the twisting motions of the extruded tubings 17 and 17'. Designated by reference numerals 22 and 22' are devices which may preferably be provided to achieve this purpose. The devices 22 and 22' are adapted to regulate the angles through which the tubings 17 and 17' are twisted, the detailed construction and operation of such devices being described later.

The tubings 17 and 17' extruded from the separate extrusion dies are then cut in a lengthwise direction by suitable cutting means 23 and 23' respectively and are thereby opened into unitary flat strips 24 and 24', respectively. The strips 24 and 24' thus have respective ribbed surfaces 25 and 25' resulting from the ribbed inner surfaces of the respective tubings 17 and 17'. The flat strips 24 and 24' are drawn with their ribbed surfaces 25 and 25' facing each other by the aid of suitable guiding means which is herein shown as comprising a series of guide rolls 26, 27 and 28 for one strip and 26', 27' and 28' for the other. The strips 24 and 24' are thereafter combined together by means of a device which is generally designated by reference numeral 29 in FIG. 1. Since, in this instance, the flat strips 24 and 24' are more or less cooled and set at this stage, it is most preferable to have them heated over the tops of the ribs on their ribbed inner surfaces which are to be fused together in the step to follow. For this purpose, a heating device 30 may be positioned between the two strips 24 and 24' immediately prior to an entrance to the device 29. The detailed construction and operation of such heating device 30 will be described later.

The device 29 may be constructed in any desired manner so far as the intent of closely combining the strips 24 and 24' together through fusion of the tops of the ribs on the ribbed inner surfaces to each other can be maintained. By way of example, such device 29 may include a pair of spaced pressing rolls 31 and 31', a pair of spaced feeding rolls 32 and 32', and a pair of guide beltings 33 and 33' passed respectively on the rolls 31 and 32 and on the rolls 31' and 32'. The clearance between the pressing rolls 31 and 31' may be adjustable through provision of means adapted to move these rolls relative to each other. The strips 24 and 24' which are passed in between the opposed guide beltings 33 and 33' are pressed upon each other by means of the pressing rolls 31 and 31'. As a consequence, the ribbed inner surfaces 25 and 25' which have been heated by the heating device 30 and are now in a fused condition are caused to closely adhere to each other at the tops of their ribs, with the result that the two strips 24 and 24' are combined into an integral multi-ply board 34, having a thickness substantially equal to the spacing between the pressing rolls 31 and 31'.

Each of the guide beltings 33 and 33' may preferably be such that it not only has a finished outer face to provide smooth outer surfaces of the board 34 but is porous throughout its entire area so as to permit the heat in the board to escape therethrough while being conveyed between the two beltings.

The device 29 may also include a heating jacket 35 for annealing purposes, which jacket is positioned on or adjacent both sides of the formed board 34 thereby to reduce internal stresses in the board, urging the inner ribbed layers to be cured slowly. A suction jacket 36 may be mounted posterior to the annealing jacket 35 whereby the outer layers of the board 34 is urged outwardly by a suction applied thereto. This will prove advantageous to avoid a problem in which the inner layers of the board tend to be slackened due to the heat stored therein to critically impair the commercial value of the resultant final product. Also, a cooling jacket 37 may be positioned posterior to the suction jacket 36 thereby to positively cool down the board 34 for having the inner layers of the board finally set before the board leaves the beltings 33 and 33'.

Designated by reference numeral 38 is cutting means which may be provided for cutting the finally produced multi-ply board to predetermined sizes.

Examples of the pattern described by the two ribbed layers formed internally of the multi-ply thermoplastic board produced in a manner above described are illustrated in FIG. 4. The pattern A is obtained with the extrusion dies 11 and 11' held stationary or turned for full rotation and, as such, consists of mutually crossing two sets a and a' of equidistantly spaced ribs. The pattern B is formed where the extrusion dies are turned alternately in clockwise and counter clockwise directions through limited angles so that mutually crossing two sets b and b' of equidistantly spaced meandering ribs result. The pattern C, on the other hand, is made up of a set c of equidistantly spaced linear or straight ribs formed with one extrusion die held stationary and another set c' of equidistantly spaced meandering ribs which are produced with the other extrusion die turned oscillatorily through a limited angle. The two sets c and c' of the ribs formed in this manner cross each other as illustrated. The pattern D is a modification of the pattern B in that the two sets d and d' of equidistantly spaced meandering ribs cross each other at positions deviated from the relative crossing phase of the pattern B.

The multi-ply thermoplastic board produced with use of the arrangements shown in FIGS. 1 and 2 is made up of two integral inner layers of mutually crossing ribs patterned as shown in FIG. 4 by way of example and a pair of outer layers which are integral with the inner layers and which have smooth outer surfaces.

As previously mentioned, an intermediate layer of foaming plastic material may be interposed in between the opposed ribbed surfaces of the two flat strips so as to significantly add to the mechanical strength of the final product. An arrangement adapted for this purpose is now illustrated in FIG. 5.

The arrangement shown in FIG. 5 is used in combination with the extrusion dies 11 and 11' of FIG. 1. Each of the extrusion dies used in this arrangement is assumed to be constructed as illustrated in FIG. 2 so that a plurality of equidistantly spaced linear ribs 20 and 20' are formed on the inner surfaces of the tubings 17 and 17' extruded from the extrusion dies 11 and 11', respectively. The tubings 17 and 17' are cut in a lengthwise direction and opened into substantially flat strips 24 and 24' having respective ribbed surfaces 25 and 25'.

Referring now to FIG. 5, the arrangement includes a series of guide rolls 39, 40, and 41 for one strip 24 and a series of guide rolls 39', 40' and 41' for the other strip 24' whereby the strips 24 and 24' are spaced wider apart from each other. The number of the guide rolls is not limited to that shown herein and may be selected in a manner to meet the individual operation requirements. A pair of spaced pressing rolls 42 and 42' are located posterior to the last guide rolls 41 and 41' and are positioned in alignment with the strips 24 and 24' being fed. A third extrusion die 43 is mounted adjacent the pressing rolls 42 and 42' and has its substantially elongated slot 43a directed toward the space between the pressing rolls. A thermoplastic material in a fused condition is supplied to the third extrusion die 43 so that a third strip 44 of the thermoplastic material is extruded through the slot 43a thereof. The thermoplastic material forming the third strip 44 may preferably be of the foaming type.

Guided by the rolls 39 to 41 and 39' to 41', the strips 24 and 24' respectively are fed between the pressing rolls 42 and 42', with their ribbed surfaces 25 and 25' facing each other. In this condition, the substantially flat strip 44 extruded from the extrusion die 43 in a fused or plastic condition is fed in between the two strips 24 and 24' which are being passed between the pressing rolls 42 and 42', respectively. Since, in this instance, the strips 24 and 24' which are about to be passed between the pressing rolls 42 and 42' respectively are more or less cooled and set, it is preferable to have the strips 24 and 24' heated on their ribbed surfaces 25 and 25', respectively before the three strips are combined, thereby enabling the strips 24 and 24' to be fused closely to the intermediate layer of the foaming plastic material. Thus, suitable heating means 45 and 45' may be located between the strips 24 and 24' posterior to the last guide rolls 41 and 41' and positioned to heat the inner ribbed surfaces 25 and 25' of the strips 24 and 24', respectively.

The pressing rolls are spaced apart a distance which may be determined in relation to the thickness of the three strips 24, 24' and 44 and/or to the internal configuration or thickness of the resultant product. For this reason, means (not shown) may be provided to adjust the relative positions of the pressing rolls 42 and 42'.

The thus formed multi-ply board, indicated by reference numeral 45, is fed by drawing rolls 46 and 46' and may be passed through the device 29 shown in FIG. 1.

Examples of the construction of the multi-ply board 45 produced in this manner are illustrated in FIG. 6. As shown, the multi-ply board 45 consists of two inner layers $a$ and $a'$ made up of respective sets of spaced ribs and integral with the layer $b$ of the foaming plastic material and pair of outer layers $c$ and $c'$ which are integral with the inner layers $a$ and $a'$. The intermediate layer $b$ of the foaming material may have a thickness with which it is integral with not only the layers $a$ and $a'$ of the spaced ribs but the outer layers $c$ and $c'$ as in the example A or otherwise the intermediate layer $b$ may be so thick as to be integral only with the layers $a$ and $a'$ of the ribs as is the case with the example B. In any event, the intermediate layer $b$ of the foaming plastic material lends itself to closely gripping the spaced ribs of the inner layers $a$ and $a'$ with the result that, even when a forceful bending stress is exerted to the multi-ply board 45, the internal ribs can be prevented from being deformed or broken. This advantage will be pronounced where the ribs to form the inner layers $a$ and $a'$ are so configured to have a portion or portions which are suitable for being gripped securely by the intermediate layer $b$ of the foaming material, examples being shown in FIG. 7.

Referring to FIG. 7, the flat strip 24 (or 24') is formed with ribs 20 each of which is provided with an enlarged top edge 20a or 20b as in the examples A and B, respectively. The enlarged top edge 20a of the example A is formed as generally rectangular in section and the enlarged top edge 20b of the example B is substantially rounded. Such configurations of the ribs 20 wil be provided by corresponding configurations of the serrations 18 defining the annular slot 16 in the extrusion die 11 (or 11').

It will now be appreciated from the foregoing description that one of the important features of the method according to this invention is that a plurality of spaced ribs are formed on each of the surfaces of the two extruded tubings and that the extrusion dies are turned either for full rotation or oscillatorily through a limited angle whereby the tubings are twisted as they are drawn from the extrusion dies and the spaced projections are caused to slant or meander with respect to the direction parallel to the axes of the extruded tubings. The angle at which the spaced ribs are deviated from the direction parallel to the axes of the tubings is an important factor determining the mechanical strength in different directions of the final product. If the tubings are twisted at great angles relative to the speeds of rotation of the extrusion dies and/or the rates at which the tubings are extruded, then the spaced ribs will be caused to deviate sidelong at relatively great angles so that relatively dense rib patterns will be described on the resultant flat strips and accordingly in the finally formed multi-ply board. It is, therefore, most preferable that means be provided so as to regulate the twisting angle of each of the tubings in relation to the rotating or oscillating speed of the extrusion die and the extrusion rate of the tubing or the speed at which the extruded tubing is drawn from the extrusion die. This will provide wide and ready selection of the mechanical strengths of the final product in different directions. An example of the means adapted for this purpose is now illustrated in FIG. 8.

The twisting angle regulating means illustrated in FIG. 8 is now denoted generally by reference numeral 50. This regulating means 50 is located intermediate the extrusion die 11 (FIG. 2) and the cutting means 23 (FIG. 1). The regulating means 50 includes a hollow annular drum 51. The annular drum 51 has an inner peripheral wall 51a the diameter of which is substantially equal to the outside diameter of the tubing 17. The inner peripheral wall 51a is finished smoothly and has formed therein a plurality of apertures 51b. The hollow annular drum 51 communicates with a source (not shown) of subatmospheric pressure such as a usual suction pump through a suction conduit 52 with the result that the subatmospheric pressure is introduced into the drum 51 during operation. The drum 51 is supported on a movable table 53 preferably through a supporting structure 54. The table 53 is movable either manually or by a driving means toward and away from the not shown extrusion die so that the distance between the regulating means 50 and the extrusion die is adjustable. Designated by reference numeral 55 is a suction gauge which may be provided on the annular drum 51 so as to meter the levels of the subatmospheric pressure drawn into the drum 51.

When, in operation, the tubing 17 which is being twisted and drawn from the extrusion die is passed through the annular drum 51 with its outer peripheral surface kept in sliding contact with the inner peripheral wall 51b of the drum 51, the tubing is urged against the outer peripheral wall 51a due to the suction drawn into the drum 51 and applied to the outer peripheral surface of the tubing through the apertures 51b formed in the wall 51a. The twisting motion of the tubing is in this manner restricted by an opposing effort resulting from the suction in the drum 51, with the result that the tubing is twisted and the spaced ribs deviated at a selected angle which is dictated by the distance between the regulating means 50 and the extrusion die. Such opposing effort exerted to the twisted tubing can be adjusted by regulating the subatmospheric pressure to be drawn into the drum 51. The suction gauge 55 will suit this purpose. The distance between the regulating means 50 and the extrusion die 11 is important because the twisting angle of the tubing is determined by such distance. If, for instance, it is desired to have the tubing twisted at a greater angle so as to have available a denser rib pattern, then the regulating means 50 should be located closer to the extrusion die. If, conversely, it is preferred to obtain a less dense rib pattern, the regulating means 50 should be located remoter from the extrusion die so as to have the tubing twisted at a smaller angle.

The pattern and the density of the pattern of the ribs to be formed internally of the final product can be selected in this manner through provision of the twisting angle regulating means above described, providing wide and ready selection of the mechanical properties of the multi-ply board produced in accordance with this invention.

The twisting angle twisting means shown in FIG. 8 is specifically adapted for use with a tubing having a ribbed surface on its inner peripheral surface. Where it is desired that the ribs be formed on the outer peripheral surface of the tubing, regulation of the twisting angle may be effected on the inner peripheral surface of the tubing. A twisting angle regulating means adapted for this purpose is now shown in FIG. 9.

Referring to FIG. 9, the tubing is now denoted by numeral 60 and shown to have a ribbed outer peripheral surface 60a. The twisting angle regulating means is positioned in alignment with the not shown extrusion die from which the tubing 60 is extruded. The regulating means includes an annular hollow structure 61 and an annular cooling jacket 62. The annular hollow structure 61 has a smoothly finished outer peripheral wall 61a which has formed therein a plurality of apertures 61b and which has a diameter substantially equal to the outside diameter of the tubing 60. The hollow structure 61 communicates with a source (not shown) of subatmospheric pressure though a suction conduit 63 so that the subatmospheric pressure is introduced into the hollow structure 61. The annular cooling jacket 62 is mounted on a forward end wall 61c of the structure 61 and communicates with a source (not shown) of a cooling medium through inlet and outlet passages 62a and 62b whereby the cooling medium is circulated through the cooling jacket 62. The cooling jacket 62 has an outside diameter substantially equal to the inside diameter of the tubing 60. As the tubing 60 is passed through the outer peripheral walls 61a and 62a of the hollow structure 61 and the annular cooling jacket 62, respectively, the tubing is urged against the surfaces of these walls by the suction applied thereto from the interior of the hollow structure 61 through the apertures 61b so that the twisting motion of the tubing is more or less obstructed.

The means shown in FIG. 9 may also be provided with a suitable means so as to be movable toward and away from the extrusion die and to permit proper selection of the angle at which the tubing is twisted. The cooling jacket 62 serves to maintain the tubing internally at a selected temperature. The smoothed outer peripheral surfaces of the cooling jacket and the hollow structure serve to provide smooth inner peripheral surfaces of the tubing.

Different forms of extrusion die, twisting angle regulating device, combination heating and heating device and combination cooling and even twisting angle regulating device has thus far been described as being preferably applicable to the production of the improved multi-ply thermoplastic board according ot the instant invention with use of the basic arrangement shown in FIG. 1. Production of such multi-ply board according to the instant invention can be significantly streamlined through modifications made to the basic arrangement of FIG. 1. For one thing, the separate extrusion dies may be connected to a common extruder machine so as to simplify the construction and operation of the overall production equipment, to facilitate the maintenance and servicing of the equipment, and to alleviate the floor space requirement in a factory in which the production equipment is installed. In this instance, it should be understood that the number of the extrusion dies to be mounted on the common extruder machine is not limited to two but that three or even more extrusion dies may be used on a single extruder machine. Or otherwise, only one extrusion die may be used to produce two strips concurrently, in which instance the tubing extruded from the extrusion die is severed longitudinally into two halves from which the two flat strips are formed. The extrusion die to be used to realize this scheme should be sufficiently large-sized so as to be capable of extruding a large-sized tubing. If further desired, the multi-ply board according to this invention may not be produced in a single continuous line. The strips formed from the extruded tubings may be stored tentatively for being afterwards combined into the multi-ply board.

An example of the arrangement using two extrusion dies mounted on a single extruder machine is now diagrammatically illustrated in FIG. 10.

Referring to FIG. 11, two extrusion dies $D_1$ and $D_2$ which are identically constructed are connected to a common extrusion machine E through respective extrusion heads $H_1$ and $H_2$, extruding two substantially identical tubings $T_1$ and $T_2$ respectively. The extruder machine E may be of a usually accepted construction but, for use in the shown arangement, it may preferably be large-sized so as to be compatible with the tandem extrusion dies $D_1$ and $D_2$. The extrusion dies $D_1$ and $D_2$ may be either of the type shown in FIG. 2 extruding a single tubing or of the type shown in FIG. 8 extruding two concentrical tubings which are to be combined into an integral multi-layer tubing. The extrusion dies $D_1$ and $D_2$ are rotatable for full rotation about their axes or for oscillation through limited angles by means of the driving gear arrangements $G_1$ and $G_2$ mounted on the extrusion heads $H_1$ and $H_2$, whereby the tubings $T_1$ and $T_2$ are twisted as they are drawn from the extrusion dies $D_1$ and $D_2$, respectively. Such twisting motions of the tubings $T_1$ and $T_2$ may be regulated restricted by the use of the previously described twisting angle regulating device which is not shown in FIG. 17. The tubings $T_1$ and $T_2$ are then cut by cutting means $C_1$ and $C_2$ and opened into flat strips $S_1$ and $S_2$ for being combined together. The shown arrangement may preferably be provided with twisting angle regulating means $A_1$ and $A_2$ the construction of which have previously been described.

The number of the extrusion dies to be mounted on a common extruder machine can be selected freely depending upon the operation requirements and/or the desired construction of the final product. FIG. 12 illustrates an example in which three extrusion dies $D_1$, $D_2$ and $D_3$ are mounted on a common extrusion machine E through respective extrusion heads $H_1$, $H_2$ and $H_3$ which are driven for rotation, thereby producing three tubings $T_1$, $T_2$ and $T_3$. The three extrusion dies are driven to rotate or oscillate by driving gear arrangements $G_1$, $G_2$ and $G_3$. The arrangement of FIG. 18 is essentially similar to the arrangement of FIG. 17 except that the intermediate tubing $T_2$ should be formed with ribs on both sides thereof so the resultant intermediate strip is enabled to closely fuse to the fused surfaces of the remaining two strips resulting from the tubings $T_1$ and $T_2$. Designated by characters $A_1$, $A_2$ and $A_3$ are twisting angle regulating means which may preferably be used for the reason previously discussed.

FIGS. 12 and 13 illustrate examples of the arrangement in which only one extrusion die D is used to produce two separate strips. The extrusion dies applicable to both arrangements are largely similar in construction to each other except that the extrusion die in FIG. 19 is adapted to produce a tubing T which has ribs formed on its inner peripheral surface R while the extrusion die D of FIG. 20 is adapted to produce a tubing which has ribs formed on its outer peripheral surface R'. Thus, in the case of FIG. 19, the tubing T is cut into a pair of flat strips having mutually facing ribbed surfaces R and R'. The thus formed flat strips are fed by suitable guide means M and are combined together substantially in situ. In the arrangement shown in FIG. 20, on the other hand, the flat strips resulting from the single tubing T' should be inverted upside down before they meet again. A plurality of guide means including $M_1$ to $M_4$ for one strip and $M'_1$ to $M'_4$ for the outer strip are provided for this purpose. The two strips are in this manner positioned to have their ribbed surfaces R' facing each other and can be combined closely together after internally heated. Designated by reference character A in FIGS. 12 and 13 is a twisting angle regulating device the construction and purpose of which have previously been described.

FIGS. 14 and 15 diagrammatically illustrate an arrangement in which the multi-ply board according to this invention is produced in successive two lines. In the former line, two separate strips S and S' are produced from tubings which are extruded either concurrently or at different times from an extrusion die or dies. The resultant strips are wound on separate winding reels W and W' for tentative storage, as illustrated in FIG. 14. In the latter line, the strips S and S' stored on the reels W and W', respectively, are unwound from the reels which now act as feeding reels in the latter line shown in FIG. 15. The strips are then heated over their ribbed surfaces and are combined together preferably by means of the device 29 which is used in the arrangement of FIG. 1.

The basic concept on which this invention is based may be modified and changed in numerous manners and it should be borne in mind that the method, and apparatus and the product obtained thereby as herein described are solely for the purpose of illustration.

What is claimed is:

1. A method for manufacturing a multi-ply thermoplastic board, comprising: concurrently extruding at least two tubings of fused thermoplastic material from separate extrusion dies, forming on at least one peripheral surface of each of the tubings a plurality of spaced parallel ribs extending in a direction substantially parallel to an axis of the tubing simultaneously as the tubing is extruded, twisting at least one of said tubings through at least a limited angle about the axis of the tubing so as to cause the ribs on the tubing to slant from said direction as the tubing emanates from the extrusion die, slitting each of the tubings in a lengthwise direction thereof, spreading out the slitted tubings into substantially flat strips, moving said strips to positions in which the strips have their ribbed surfaces in face-to-face relationship while the ribs are in a fused condition at least at their peaks, and combining the strips together through fusing peak-to-peak contact of the ribs on the strips at individual intersections of the ribs on the facing strips.

2. A method as set forth in claim 1, in which the tubing is twisted for full rotation about said axis for causing the ribs on the twisted tubing to slant substantially spirally from the longitudinal direction as the tubing is drawn.

3. A method as set forth in claim 1, in which the tubing is twisted for oscillation about said axis through a limited angle for causing the ribs on the twisted tubing to meander as the tubing is drawn.

4. A method as set forth in claim 1, further comprising feeding a sheet of fused thermoplastic material between facing ribbed surfaces of the strips which are about to be combined together for forming an intermediate layer which is securely fused to said ribs on the facing ribbed surfaces.

5. A method as set forth in claim 4, in which said fused thermoplastic material is a foaming material.

6. A method as set forth in claim 1, in which the strips are combined together in a process comprising pressing said strips to each other, and annealing the combined strips for reducing internal stresses therein.

7. A method as set forth in claim 6, in which said process further comprises applying a suction to outer surfaces of the combined and annealed strips for urging the strips outwardly.

8. A method as set forth in claim 6 in which said process still further comprises positively cooling the annealed strips for causing the inner ribbed surfaces to be finally set.

9. A multi-ply thermoplastic board manufactured in a method as set forth in claim 1.

10. A method for manufacturing a multi-ply thermoplastic board, comprising: concurrently extruding first, second and third continuous tubings of fused thermoplastic material from separate extrusion dies, forming on one peripheral surface of each of the first and third tubings and on inner and outer peripheral surfaces of said second tubing a plurality of spaced parallel ribs extending in directions substantially parallel to axes of the respective tubings simultaneously as the tubings are extruded from said extrusion dies, twisting at least one of said tubings through at least a limited angle about the axis of the tubing so as to cause the ribs on the tubing to slant from the lengthwise direction of the tubing as the tubing emanates from the extrusion die, slitting each of the tubings in a lengthwise direction thereof, spreading out the slitted tubings into the first, second and third substantially flat strips resulting respectively from said first, second and third tubings, moving said strips to positions in which said second strip has its opposed ribbed surfaces in face-to-face relationship with the ribbed surfaces of said first and third strips while the ribs of the strips are in a fused condition at least at their peaks, and combining the strips together through fusing peak-to-peak contact of the ribs on the first and second strips and of the ribs on the second and third strips at individual intersections of the ribs in face-to-face relationship.

References Cited
UNITED STATES PATENTS

| | | | |
|---|---|---|---|
| 2,750,631 | 6/1956 | Johnson | 156—244 |
| 2,848,747 | 8/1958 | Dixon | 264—146 |
| 3,265,552 | 8/1966 | Berggren et al. | 156—244 |
| 3,342,657 | 9/1967 | Dyer | 156—244 |
| 3,416,982 | 12/1968 | Petzetakis | 156—244 |
| 3,416,986 | 12/1968 | Carley | 264—146 |
| 3,436,442 | 4/1969 | Saks | 264—95 |
| 3,490,973 | 1/1970 | Graff et al. | 264—95 |
| 3,174,887 | 3/1965 | Voelker | 156—79 |
| 3,533,896 | 10/1970 | Hartig | 161—69 |
| 3,274,315 | 9/1966 | Kawamura | 264—93 |
| 3,515,778 | 6/1970 | Field et al. | 156—244 |

MORRIS SUSSMAN, Primary Examiner

U.S. Cl. X.R.

156—244, 269, 259, 271, 79; 161—161; 264—176, 209